(12) United States Patent
Metzler

(10) Patent No.: US 12,277,727 B2
(45) Date of Patent: Apr. 15, 2025

(54) SURVEYING DEVICE WITH IMAGE EVALUATOR FOR DETERMINING A SPATIAL POSE OF THE TARGET AXIS

(71) Applicant: HEXAGON TECHNOLOGY CENTER GMBH, Heerbrugg (CH)

(72) Inventor: Bernhard Metzler, Dornbirn (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 17/750,156

(22) Filed: May 20, 2022

(65) Prior Publication Data

US 2022/0375122 A1    Nov. 24, 2022

(30) Foreign Application Priority Data

May 20, 2021    (EP) .................................... 21175013

(51) Int. Cl.
   *G06T 7/73*    (2017.01)
   *G01C 3/02*    (2006.01)
   (Continued)

(52) U.S. Cl.
   CPC ................. *G06T 7/74* (2017.01); *G01C 3/02* (2013.01); *H04N 23/695* (2023.01);
   (Continued)

(58) Field of Classification Search
   None
   See application file for complete search history.

(56) References Cited

U.S. PATENT DOCUMENTS 9,476,695 B2 * 10/2016 Becker ................. G01C 15/002
9,866,737 B2    1/2018 Uemura et al.
(Continued)

FOREIGN PATENT DOCUMENTS

CN    105637413 A    6/2016
EP    3 584 533 A1    12/2019
(Continued)

OTHER PUBLICATIONS

Extended European Search Report dated Jan. 25, 2022 as received in Application No. 21175013.8.
(Continued)

*Primary Examiner* — Edemio Navas, Jr.
(74) *Attorney, Agent, or Firm* — Maschoff Brennan

(57) ABSTRACT

A surveying device for a coordinative position determination of a spatial point, wherein the surveying device comprises a camera which is fixedly mounted to a transmission unit in a way that its field-of-view moves with a targeting component. The surveying device further comprises an image evaluator, configured for automatically identifying corresponding image features in different images of the camera, wherein the corresponding image features represent reference points within the environment, and for a derivation of a spatial transformation parameter from a motion of the corresponding features, wherein the spatial transformation parameter provides for a determination of a difference of a spatial pose of a target axis of the surveying device between different distance measurements which correspond to different images.

14 Claims, 3 Drawing Sheets

(51) Int. Cl.
*H04N 5/232* (2006.01)
*H04N 5/247* (2006.01)
*H04N 23/695* (2023.01)
*H04N 23/698* (2023.01)
*H04N 23/90* (2023.01)

(52) U.S. Cl.
CPC ........... *H04N 23/698* (2023.01); *H04N 23/90* (2023.01); *G06T 2207/10028* (2013.01); *G06T 2207/30204* (2013.01); *G06T 2207/30244* (2013.01)

(56) References Cited

U.S. PATENT DOCUMENTS

| | | | |
|---|---|---|---|
| 10,645,291 B1* | 5/2020 | Mickel | H04N 23/74 |
| 2013/0094707 A1 | 4/2013 | Metzler | |
| 2014/0036066 A1* | 2/2014 | Sharp | G06T 7/70 |
| | | | 348/135 |
| 2014/0062772 A1 | 3/2014 | Jasiobedzki et al. | |
| 2015/0130928 A1* | 5/2015 | Maynard | H04N 7/18 |
| | | | 348/135 |
| 2016/0171776 A1* | 6/2016 | Bridges | G06T 1/0007 |
| | | | 348/47 |
| 2018/0255211 A1* | 9/2018 | Kniffen | G06V 10/82 |
| 2019/0037173 A1* | 1/2019 | Lee | G06F 3/04842 |
| 2019/0155296 A1* | 5/2019 | Moore | G05D 1/0234 |
| 2020/0056886 A1* | 2/2020 | Hornung | G06T 7/70 |
| 2020/0249017 A1* | 8/2020 | Török | G06V 20/64 |
| 2020/0263986 A1* | 8/2020 | Vogel | G01C 1/04 |
| 2021/0056716 A1* | 2/2021 | Mörwald | G01C 15/002 |
| 2021/0389430 A1* | 12/2021 | Vogel | G06F 3/04842 |

FOREIGN PATENT DOCUMENTS

| | | |
|---|---|---|
| JP | 2010-128610 A | 6/2010 |
| WO | 2015/169338 A1 | 11/2015 |

OTHER PUBLICATIONS

CN Office Action dated Jan. 3, 2025 as received in Application No. 202210507133.2.

* cited by examiner

SURVEYING DEVICE WITH IMAGE EVALUATOR FOR DETERMINING A SPATIAL POSE OF THE TARGET AXIS

BACKGROUND

The present disclosure relates to a surveying device for a coordinative position determination of a spatial point.

Surveying devices are used in variety of fields which necessitate measuring coordinative positions of spatial points or determination of geometric relationships, e.g. on construction sites, in industrial facilities, or in land surveying.

For example, surveying devices, e.g. embodied as total stations, are used to measure coordinates of spatial points with respect to the position of the surveying device, e.g. to generate a set of spatial measurement points referenced to a common coordinate system. A further common functionality of a surveying device relates to staking out points in the environment, e.g. where a first person aligns a telescope target axis of the surveying device to match a calculated pose and guides a second person carrying a stake-out device, e.g. comprising a retro-reflector, towards a targeting point, which is defined by the target axis of the surveying device and a calculated distance from the surveying device.

Typically, at each installation location of the surveying device, its accurate external orientation must be correctly determined in order to accurately measure 3D coordinates of a measuring point with respect to the location of the surveying device and/or to accurately set a pose of the target axis for a stake-out process. Generic setup workflows include the use of GNSS, a plumb determination, and/or the measurement of one or multiple reference points with known geometric relationships.

By way of example, for a coordinative measurement today's total stations are typically aligned exactly horizontally, e.g. with the help of a bubble level or with a tilt sensor, wherein coordinates of a measuring point are derived by measuring the distance, the horizontal, and the vertical angle while aiming with a targeting component (often referred to as "telescope") to this point. The targeting component provides transmission and reception of a laser beam, wherein a distance in direction of the laser beam is measured by an electro-optic distance measurement device. The electro-optic distance measurement is carried out by emitting the laser beam to provide for a pulse time-of-flight (TOF) measurement method, a phase shift measurement method, or an interferometric method. The orientation of the targeting component is determined by angle measuring means of the surveying device, e.g. goniometers comprising angle encoders such as absolute or incremental rotary encoders.

Once the surveying device is set up in a specific location, the 3D coordinates of a multiplicity of points of the environment can be determined, wherein the absolute 3D coordinates of a measuring point are determined by measuring the change of a spatial alignment of the targeting component from an initial, known spatial alignment to the spatial alignments when targeting the measuring points, provided that all of the multiple points to be measured have direct line-of-sight to the surveying device and lie within the measuring range of the surveying device.

Often a measurement project requires relocating the surveying device, e.g. because line-of-sight to all relevant measuring points at once is not given. The surveying device then has to be relocated and newly set up in order to measure all the relevant points.

From one measurement location of the surveying device typically a multitude of spatial points are measured such that they can be (e.g. in a rather straight-forward way) referenced to a common coordinate system relative to the surveying device.

Measurement points (coordinatively measured spatial points) measured from different locations of the surveying device have to be related to each other using a process often referred to as referencing, point set registration, or scan matching. For example, this can be done solely based on the data of the 3D coordinate points measured with the electronic distance measurement comprised in a surveying device. By way of example, known methods for referencing data of a total station at different measurement locations involve the use of a polygon course or the so-called free stationing method.

Both the setting up the surveying instrument and the provision of data, which can be referenced to a local or global coordinate system of the environment typically involve measuring procedures, wherein reference points with known coordinates are measured. These are often tedious and error prone tasks.

SUMMARY

It is therefore an object of the present disclosure to provide improved and/or simplified setting-up of a surveying instrument as well as improved and/or simplified referencing of data of the surveying instrument.

A particular object is to provide a setting-up of the surveying instrument and a referencing measurement of the surveying instrument, which are faster and at the same time less error prone.

A further object is to provide a surveying instrument with enhanced application and operation possibilities.

These objects are achieved by realizing at least part of the features of the independent claims. Features which further develop the disclosure in an alternative or advantageous manner are described in the dependent patent claims.

The disclosure relates to a surveying device for a coordinative position determination of a spatial point, wherein the surveying device comprises a transmission unit having a targeting component that can be rotated about two axes of rotation. The targeting component is configured to provide for a distance measurement, which comprises transmission of measurement radiation by the targeting component, thereby defining a target axis, and reception of returning measurement radiation by the targeting component.

The surveying device comprises a camera which is fixedly mounted to the transmission unit in a way that its field-of-view moves with the targeting component. Thus, a fixed spatial reference of the camera field-of-view relative to the target axis is provided.

The camera is configured to capture two images, wherein each of the two images is associated with a different distance measurement, each of which comprises transmission and reception of corresponding measurement radiation. Thus, the two images are associated with different instants in time.

By way of example, the camera has a field-of-view of 90 degrees or greater, e.g. 180 degrees, e.g. wherein the camera has a fish-eye lens. More specifically, the camera is embodied to provide for a field-of-view cone having an opening angle of 90 degrees or greater, e.g. 180 degrees.

The surveying device comprises an image evaluator, configured for automatically identifying corresponding image features that are present in both of the two images. The corresponding image features represent reference points within the environment, e.g. significant points such as edges, corners, high-intensity points, or, more generally points which can be detected by a generic feature detector. The image evaluator is further configured for a derivation of a spatial transformation parameter from a motion of the corresponding image features (by making use of the fixed spatial reference of the camera field-of-view relative to the target axis), wherein the spatial transformation parameter provides for a determination of a difference of a spatial pose of the target axis between the different distance measurements which correspond to the two images.

Thus, according to one aspect, both the orientation and the position (so-called six-degrees-of-freedom pose or simply pose) of the targeting component can be continuously tracked, e.g. wherein the camera acquires an image each time a distance measurement is carried out. Thus, for example, with each distance measurement, a pose difference between the actual pose and a previous pose of the targeting component can be determined.

The pose of the targeting component is tracked with respect to the environment, i.e. not necessarily relative to an instrument zero point or to an instrument base. Thus, an exact horizontal alignment of an instrument base is not needed anymore. In case the surveying device is built in a conventional manner—wherein the surveying device comprises a base and a support that is mounted to the base rotatably about a first (so-called vertical) axis of rotation, wherein the targeting component is mounted to the support rotatably about a second (so-called horizontal) axis of rotation—no angle encoders or tilt sensors are needed to determine the orientation of the targeting component.

In an alternative setup, the feature tracking is combined with data from a tilt sensor and/or angle encoders. By way of example, there could be an angle sensor measuring the horizontal angle of the target axis, but no angle sensor measuring the vertical angle of the target axis. The latter is determined based on the image data of the camera and the tracking of the image features. Moreover, the image data and the data from the angle and tilt sensors can be fused together to determine the orientation of the targeting component.

In case the surveying device experiences a bump or is deliberately moved into a new position the position and orientation of the new setup can be determined with respect to the previous one. For example, this can be done by a traditional SLAM process, e.g. a visual SLAM process. Thus, not only the orientation, but all 6-degrees-of-freedom (6-DoF), i.e. the three coordinates (X, Y, Z) and the three orientation angles are determined.

In one embodiment, the surveying device comprises a base and a support that is mounted to the base such that it can be moved in a motorized fashion relative to the base about a first axis of rotation, wherein the targeting component is mounted to the support such that it can be moved in a motorized fashion relative to the support about a second axis of rotation, and the camera is mounted at the targeting component and has a field-of-view of 90 degrees or greater, e.g. 180 degrees, more specifically wherein the camera provides a field-of-view cone having an opening angle of 90 degrees or greater, e.g. 180 degrees.

By way of example, the camera is arranged that the second axis of rotation intersects the field-of-view of the camera, e.g. wherein the camera is arranged that the optical axis of the objective lens of the camera is parallel to the second axis of rotation. In particular, the camera is arranged that the optical axis of the objective lens of the camera is co-axial with the second axis of rotation. Typically, such a camera placement corresponds to a sideward viewing camera, e.g. in a direction orthogonal to the targeting axis.

For example, the surveying device comprises a further camera, arranged that the two cameras are both sideward viewing in opposite directions. In case the two cameras each have a field of view of 180 degrees, such a setup provides an all-around field of view.

Accordingly, in a further embodiment, the surveying device comprises a further camera which is fixedly mounted to the transmission unit in a way that its field-of-view moves with the targeting component, wherein the further camera is arranged that the optical axis of the objective lens of the further camera is parallel to the second axis of rotation, e.g. co-axial with the second axis of rotation. Here, the previously described camera and the further camera are facing in opposite directions. Similar to the previously described camera, the further camera is configured to capture two images, wherein each of the two images is associated with a different distance measurement, each of which comprises transmission and reception of corresponding measurement radiation.

For example, the camera and the further camera are arranged and configured that the field of views of the camera and the further camera have an overlap in all peripheral zones of the field of views of the camera and the further camera, e.g. wherein the surveying device is configured to generate a full dome panorama image taking into account images captured from both the camera and the further camera.

In another embodiment, the camera is mounted at the targeting component such that the optical axis of the objective lens of the camera is perpendicular to the second axis of rotation. For example, this allows to have a camera field-of-view in a direction of the targeting axis, e.g. wherein the camera is arranged in a so-called forward-viewing position (towards the target). Similar to the sideward viewing cameras described above, a further camera may be used in a so-called backward-viewing position (opposite to the forward-viewing position.

In one embodiment, the surveying device is configured to use the spatial transformation parameter to determine an angular change of the targeting component's orientation with respect to a rotation around at least one of the first and the second axis of rotation between the different distance measurements which correspond to the two images. Thus, the spatial transformation parameter can be used for determining an orientation of the targeting component with respect to at least one of the first and the second axis of rotation.

In another embodiment, the surveying device is configured to use the spatial transformation parameter to determine a change in position of the surveying device between the different distance measurements which correspond to the two images. Thus, this embodiment allows to take into account occasional bumps against the surveying device or deliberate reposition of the surveying device.

In a further embodiment, the surveying device comprises an inertial measuring unit and/or a tilt sensor arranged in the targeting component, wherein the surveying device is configured to determine an absolute alignment to the gravitational field by making use of the inertial measuring unit and/or the tilt sensor. For example, this allows to reference coordinative position determinations of multiple spatial points to a common coordinate system having known alignment with respect to the gravity vector.

In a further embodiment, the surveying device is configured to trigger an image capture by the camera, and if applicable the further camera, at each instant when a distance measurement is carried out and to provide an image associated with the image capture to the image evaluator.

In a further embodiment, the surveying device comprises an acceleration sensor configured for measuring a linear and/or angular acceleration, wherein the surveying device is configured to trigger an image capture by the camera, and if applicable the further camera, when the acceleration sensor detects a linear and/or angular acceleration with an absolute value above a threshold value and to provide an image associated with the image capture to the image evaluator. By way of example, this allows to make sure that each orientation and/or position change of the targeting component before each distance measurement (and thus coordinative position determination of a target point) can be taken into account.

For example, the surveying device is configured to identify a moving state of the targeting component based on the acceleration sensor and the image capture is triggered at a defined frame rate, e.g. ten frames per second, during the moving state. A feature tracking algorithm, e.g Lukas-Kanade-Tracking, may then be used to track the image features.

In a further embodiment, the surveying device comprises a relocation mode, wherein a series of images is captured by the camera during relocation from a first location of the surveying device to a second location of the surveying device. A simultaneous localisation and mapping (SLAM) process is carried out using the series of images and, based thereof, a difference of a spatial pose of the target axis in the first location, e.g. corresponding to a distance measurement carried out from the first location, and a spatial pose of the target axis corresponding to a distance measurement carried out from the second location is determined.

In particular, the surveying device comprises a movement sensor configured to detect a start and a stop of a movement of the surveying device as a whole and the relocation mode is triggered and stopped by the movement sensor.

Optionally, at the new setup of the surveying device at the second location an automatic measurement procedure can be carried out in order to provide reference between coordinative data acquired at the second location and a previous, e.g. the first, location. The measuring device is identifying a sub-set of points that have been measured at a previous location. The surveying device then automatically aims at these points and measures the coordinates of these points from the current position. These coordinates can then be used to determine the position of the new setup more accurately.

By way of example, having an inertial measurement unit as described above, the SLAM procedure—in particular an initialization of a scale—can be based on accelerations measured with the inertial measurement unit. Alternatively or in addition, the SLAM procedure can be based on measurement points measured at the first location and/or on stereo-measurements in overlapping regions of the camera and the further camera. For example, the camera and the further camera may be embodied as fish-eye cameras.

Accordingly, in a further embodiment, the surveying device comprises an automatic target search functionality configured to automatically find a spatial reference point within the environment, wherein the spatial reference point is a spatial point associated with a known visual attribute, e.g. a point associated with a particular geometric feature such as a corner point of a window. For example, the surveying device is configured that, in the course of a distance measurement of the spatial reference point by means of the measurement radiation, the visual attribute is automatically provided by a visual pickup unit of the surveying device, e.g. provided by the camera or another specific pick-up device (e.g. another camera), wherein the surveying device is configured to associate the visual attribute with a coordinative position determined by the surveying device by means of the measurement radiation. The reference points may be spatial points (e.g. regular target points to be measured) for which visual attributes have been determined as described above or the reference points may be dedicated points having known coordinates and visual attributes, e.g. wherein a dataset including dedicated spatial points with associated visual attributes and known coordinates is provided to the surveying device.

In this embodiment, the surveying device is further configured to carry out a distance measurement to three spatial reference points from the first location and to carry out, automatically based on the target search functionality, a distance measurement to the three spatial reference points from the second location. Thus, the surveying device is configured to measure 3D coordinates of the three different spatial reference points both from the first location and (automatically) from the second location, and based on a position resection technique to refine the derivation of the spatial transformation parameter by taking into account the 3D coordinates of the three different spatial reference points measured from the first and the second location.

In particular, a difference of a pose of the target axis in the first location and a pose of the target axis in the second location is determined by means of the SLAM process, wherein from the second location the three spatial reference points are aimed at by taking into account the difference of the pose of the target axis.

Another aspect relates to the use of reference markers in order to reference measurement points generated from different setup locations of the surveying device with respect to a common coordinate system. By way of example, dedicated markers, e.g. realized as matrix bar codes such as QR-codes, can be used to establish reference points on a surveying site. The coordinates of these markers can be measured once, e.g. with a high-end total station. The coordinates of these markers are then given in a common coordinate system for the whole site, e.g. wherein the z-axis of such a coordinate system is parallel to the gravity vector.

In a further embodiment, the surveying device is configured to access reference data providing an outer coordinate system and to recognize an imaged visual attribute of a marker in an image captured by the camera. By assuming that the visual attribute of the marker provides an indication of a main axis of the outer coordinate system, the surveying device is configured to derive an orientation of the target axis in the outer coordinate system by analyzing the imaged visual attribute of the marker.

By way of example, the reference data further comprises coordinates of the marker in the outer coordinate system and the surveying device is configured to identify the marker and to derive a pose of the target axis in the outer coordinate system by analyzing the imaged visual attribute, e.g. by deriving a position of the marker in a local coordinate system of the surveying device derived by a SLAM process of the surveying device and by comparing the position of the marker in the local coordinate system with the coordinates of the marker in the outer coordinate system.

A further aspect relates to a surveying device for a coordinative position determination of a spatial point, wherein the surveying device comprises a base, a support that is mounted to the base rotatably about a first axis of rotation. The surveying device further comprises a targeting component that is mounted to the support rotatably about a second axis of rotation and configured to provide for a distance measurement, which comprises transmission of measurement radiation via a beam exit of the targeting component, thereby defining a target axis, and reception of returning measurement radiation via a beam entry of the targeting component.

The support has a leg component that rises from the base in a direction parallel to the first axis of rotation and the leg component is pierced by the second axis of rotation. The targeting component is arranged in a raised position from the base and is pierced by both the first and the second axes of rotation, wherein the targeting component is connected to the leg component via a shaft, which provides rotation of the targeting component about the second axis of rotation.

According to this aspect, the surveying device comprises a camera which is fixedly mounted on a remote axial end of the shaft, the remote axial end being the axial end remote from the targeting component, and the camera is mounted in a way that a camera opening points away from the targeting component and provides such a field-of-view of the camera so that the second axis of rotation intersects the field-of-view of the camera and the field-of-view of the camera moves with a movement of the shaft. By way of example, the camera is arranged that the optical axis of the objective lens of the camera is parallel to the second axis of rotation, e.g. co-axial with the second axis of rotation.

By way of example, this particular structure of the surveying device provides for a compact opto-mechanical and electro-mechanical packaging of the targeting component, while at the same time an efficient and robust derivation of a spatial transformation parameter as described above is ensured. For example, the often temperature sensitive sensor of the camera, e.g. an infrared sensor, requiring a rather cool environment is placed as far away from the center of the targeting component, which often generates a lot of heat because of laser components of a laser range finder used for the distance measurement.

The technical teachings described for the aspects above are directly applicable to this aspect. For example, in one embodiment, the camera has a field of view with a horizontal aperture angle of at least 90° and a vertical aperture angle of at least 90°, in particular wherein the horizontal aperture angle is at least 180° and the vertical aperture angle is at least 180°. By way of example, the camera is embodied as a fish-eye camera.

In a further embodiment, the surveying device comprises an inertial measuring unit and/or a tilt sensor arranged in the targeting component and the surveying device is configured to determine an absolute alignment to the gravitational field by making use of the inertial measuring unit and/or the tilt sensor.

BRIEF DESCRIPTION OF THE DRAWINGS

The surveying device according to the different aspects are described or explained in more detail below, purely by way of example, with reference to working examples shown schematically in the drawing. Identical elements are labelled with the same reference numerals in the figures. The described embodiments are generally not shown true to scale and they are also not to be interpreted as limiting. Specifically.

DETAILED DESCRIPTION

Figure 1:
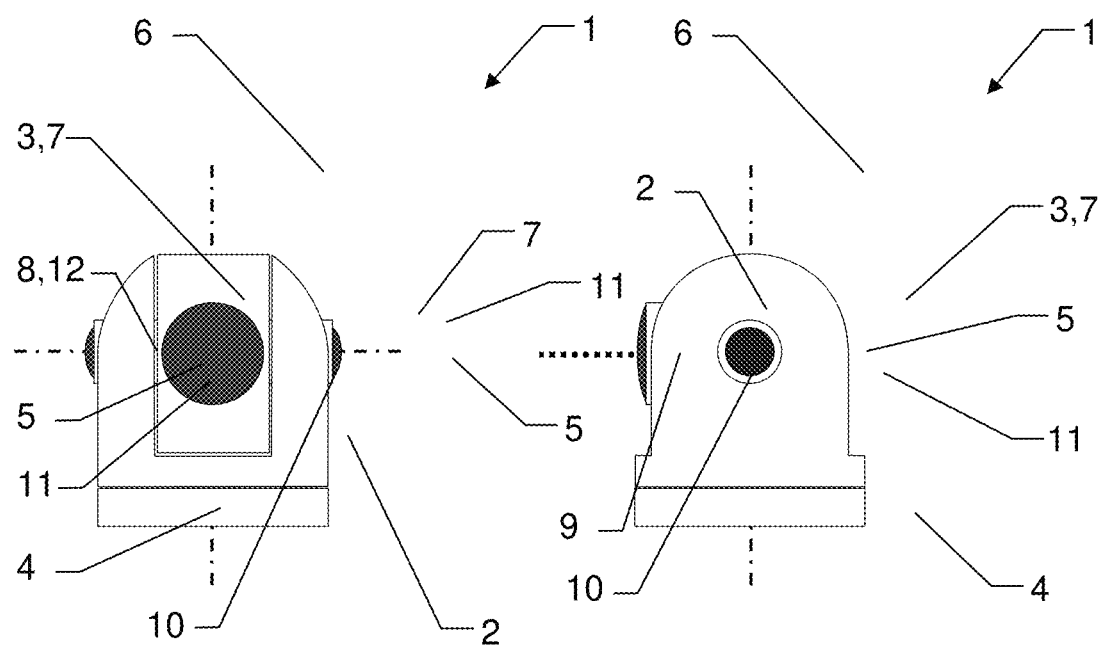
FIG. 1: an embodiment of the surveying device from two different perspectives, wherein for feature tracking two cameras are mounted to the targeting component such that the second axis of rotation intersects the field of views of the two cameras.

FIG. 1 depicts an exemplary embodiment of the surveying device 1 in two different side perspectives. Here, the surveying device 1 is embodied as a total station with a telescope 2, a support 3, and a base 4. A pair of fish-eye cameras 5 is integrated into the telescope 2, e.g. wherein each camera 5 has a field-of-view which is larger than 180° and each of the cameras 5 is rotating together with the telescope 2.

The telescope 2 can be rotated in a motorized fashion, whereby the support 3 is attached to the base 4 so as to be rotatable about a vertical axis of rotation 6 and the telescope 2 is attached to two opposing leg components 7 of the support 3 so as to be rotatable about a horizontal axis of rotation 8.

The total station 1 is configured for carrying out a distance measurement by means of a laser beam 9 emitted via a beam exit 10 of the telescope 2, thereby defining a target axis. In the example shown, the beam exit 10 is also the beam entry for reception of returning parts of the laser beam 9.

By way of example, the telescope 2 is connected to the two opposing leg components 7 via two shafts 11 on opposing sides of the telescope 2, wherein the cameras 5 are mounted on remote axial ends of the shafts 11 and the optical axes 12 of the objective lenses of the cameras are co-axial with the horizontal axis of rotation 8. In combination, the two cameras 5 provide for derivation of a full-dome panorama image.

Figure 2:
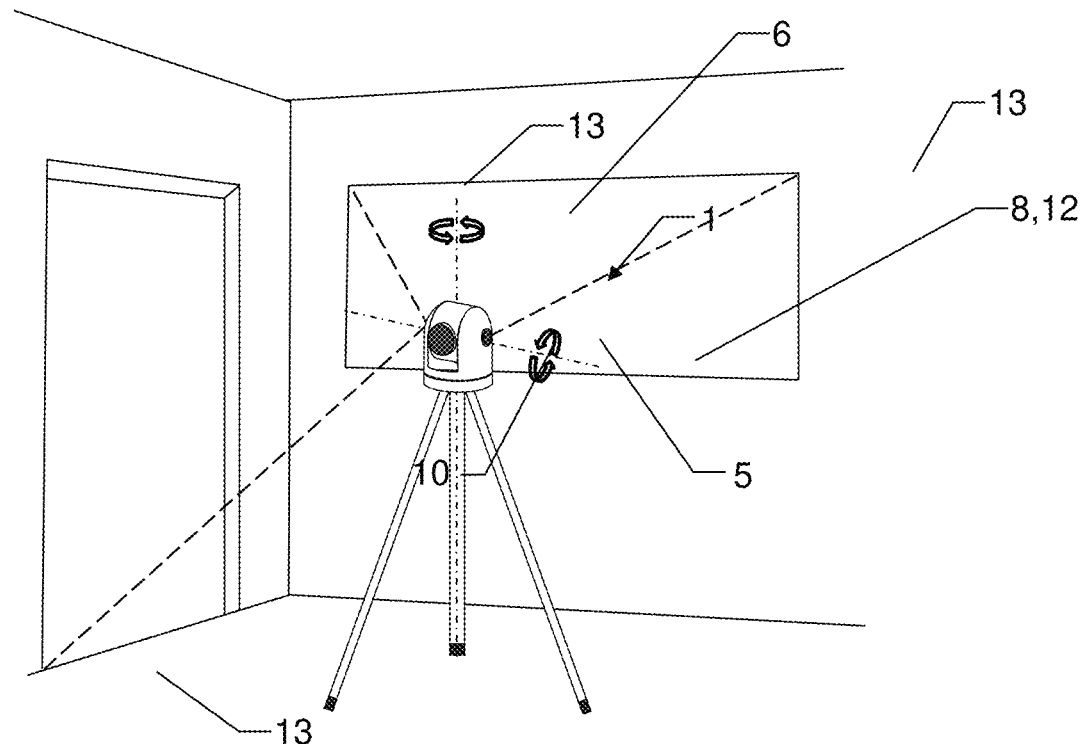
FIG. 2 an exemplary workflow with a surveying device, wherein the orientation of the targeting component is determined by tracking image features in a camera image.

FIG. 2 schematically depicts an exemplary workflow with a surveying device 1, which in the example shown is embodied as previously described with reference to FIG. 1. For measuring a spatial point by means of the laser beam 9 (not shown, see FIG. 1), the telescope is moved with respect to the horizontal and vertical axes of rotation 6, 8 in order to aim the laser beam onto one or multiple different spatial points (not shown). During the rotation of the telescope about the horizontal and vertical axis point features 13 are tracked in the panorama images captured with the fish-eye cameras 5. The point features 13 are significant points detected with a feature detector, e.g. edges, corners, or high-intensity reflections. From the motion of the features 13 the change of the orientation, e.g. the horizontal and vertical angle with respect to the initial orientation of the telescope are measured.

Upon triggering a measurement, e.g. upon triggering an electro-optical distance measurement by the laser beam the coordinates of the spatial point to be measured is computed from the measured distance and the determined horizontal and vertical angle changes with respect to the initial orientation of the telescope.

By way of example, the determination of the change in orientation is based on a "simplified" SLAM process, where only the orientation angles are computed while the position of the telescope is considered as fixed.

Consequently, no angle encoders or tilt sensors are needed to determine the orientation of the telescope.

In an alternative setup, the camera data are combined with data from a tilt sensor and/or angle encoders. By way of example, there could be angle encoders for both axes of rotation 6, 8 or for only one of the axes of rotation, e.g. there could be one angle sensor measuring the horizontal angle but no angle sensor measuring the vertical angle. The latter would then be determined based on the tracking of the features 13 in the image data of the cameras 5. Moreover, the image data and the data from the angle and tilt sensors can be fused together to determine the orientation of the telescope.

Figure 3:
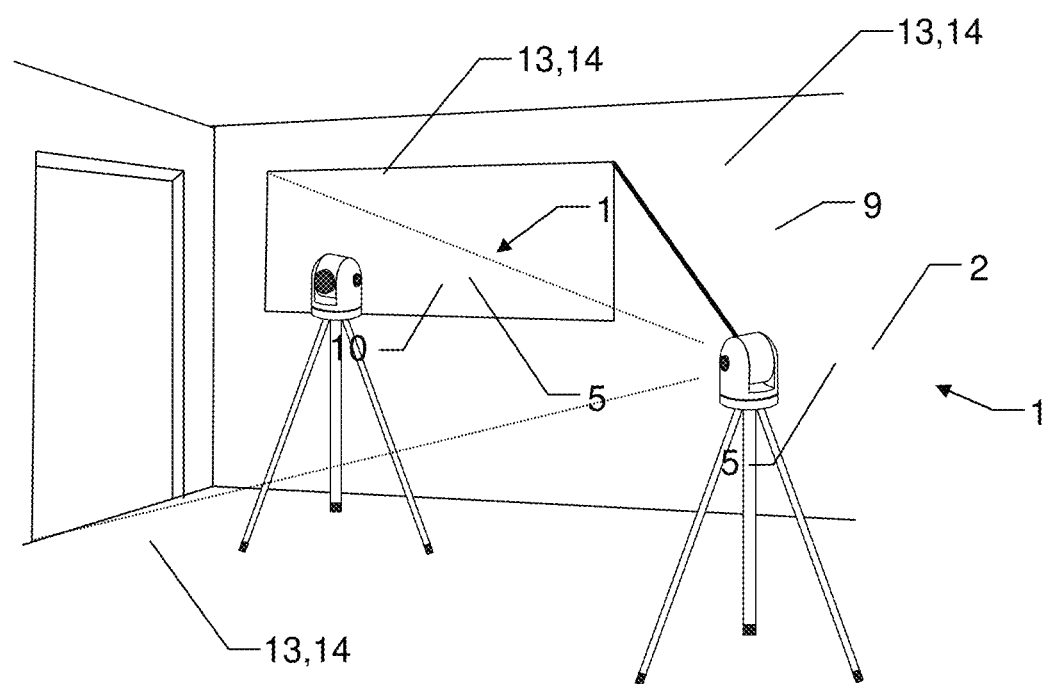
FIG. 3 a further exemplary workflow with a surveying device, wherein the surveying device is relocated, and performs a SLAM process between the first location and the second location and a calibration measurement to three spatial reference points to refine the derivation of the spatial transformation parameter.

FIG. 3 schematically depicts the surveying device in a further location, away from the location depicted by FIG. 2. For illustrative purposes, the previous setup is still shown in the figure. Since now also the position of the surveying device (and thus the telescope and support) has changed, not only the orientation but all six degrees of freedom (three coordinates (X, Y, Z) and three orientation angles) of the telescope 2 at the new setup are determined with respect to a previous position and orientation of the telescope at the previous location of the surveying device 1. Again, this is done by performing a SLAM process between the first location and the second location.

Optionally, at the new setup an automatic measurement procedure is carried out, wherein three spatial reference points with known coordinates are measured to refine the derivation of the spatial transformation parameter.

The surveying device 1 is identifying based on the image data of the camera 5 a sub-set of points that have been measured at the previous location. Here, for example, it is assumed that the spatial points 13 used for feature tracking were also actual measurement points for which the surveying device determined accurate coordinates by means of the laser beam 9. Thus, these spatial points can be used in a twofold way, namely as features 13 for feature tracking and as spatial reference points 14 to refine the derivation of the spatial transformation parameter.

The surveying device 1 then automatically aims at these spatial reference points 14, e.g. by using positional information provided by the SLAM process and an automatic target search functionality, and measures the coordinates of these points from the current position by means of the laser beam 9. These coordinates are then used to determine the position and pose of the support 3 at the new setup more accurately.

Figure 4:
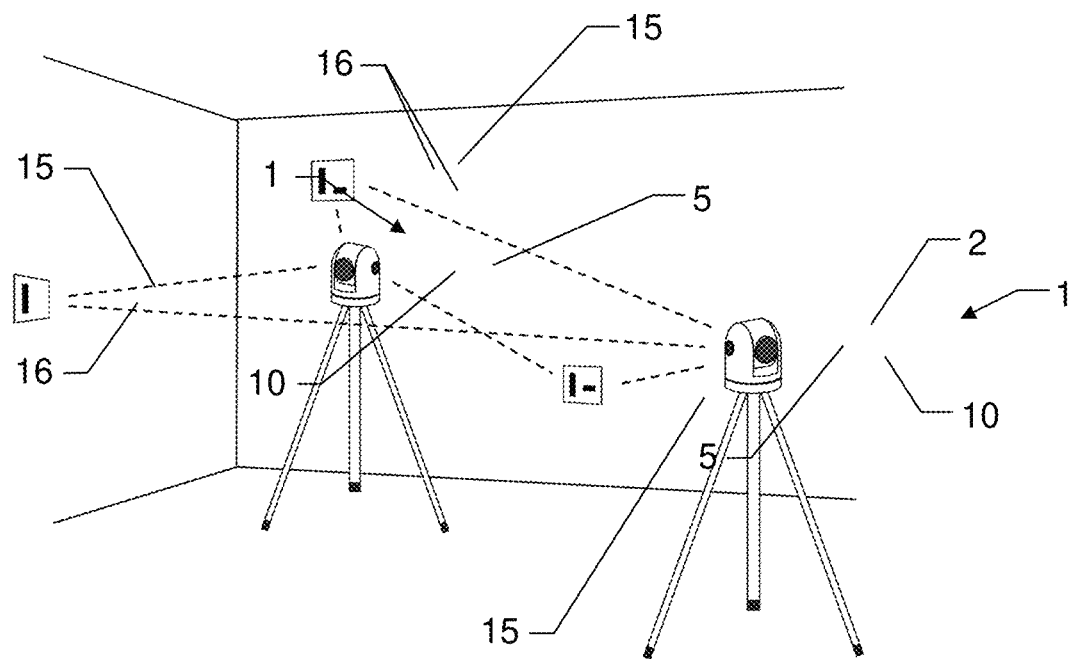
FIG. 4 a further exemplary workflow with a surveying device, wherein dedicated markers are used for referencing measurement points generated from different locations of the surveying device, FIG. 5 an exemplary 360° panorama image generated by a surveying device, merged to a full dome panorama image (top part) and merged at one side of the two captured images (bottom part).

FIG. 4 shows a further embodiment, wherein dedicated markers 15 are used to reference measurement points generated from different locations of the surveying device 1. The coordinates of these markers 15 are given in a common coordinate system for the whole site. For example, the coordinates of these markers 15 are measured once, e.g. with a high-end total station.

The surveying device 1 is configured to recognize an imaged visual attribute 16 of a marker 15 in an image captured by the camera 5. By using the visual attribute 16, here an indication of the horizontal and vertical axes of the common coordinate system, the surveying device derives an orientation of the telescope 2 in the common coordinate system.

By way of example, it may also be sufficient to have only an indication of the gravity vector in order to provide the surveying device 1 with a reference of the gravity vector. This makes a tilt sensor obsolete.

The characteristics of the markers 15 are known to the surveying device 1 and the markers are fixedly attached to a surveying site. Targeting of the markers can be performed using an eye-piece or using an opto-electronic image pickup of the surveying device, wherein an targeting image is displayed to the user on a mobile device, e.g. a tablet. Alternatively or in addition, the surveying device is configured to automatically search, identify, and measure the markers 15.

In order to monitor the construction progress, it might be desirable to survey the construction site multiple times, e.g. every month. Assuming that the markers 15 did not change their position and/or orientation, the surveying device 1 can be set up at different times in different locations on the construction site, while using the markers to reference measurement points into the common coordinate system, e.g. by targeting the same markers again. By way of example, the surveying device 1 is provided with reference data, which comprise the coordinates of the markers 15 in the common coordinate system. Therefore, by performing coordinate measurements of different markers 15 from a current measurement location, the surveying device 1 is able to absolutely reference measurement points from that current location with respect to the common coordinate system.

Figure 5:
Figure 5:
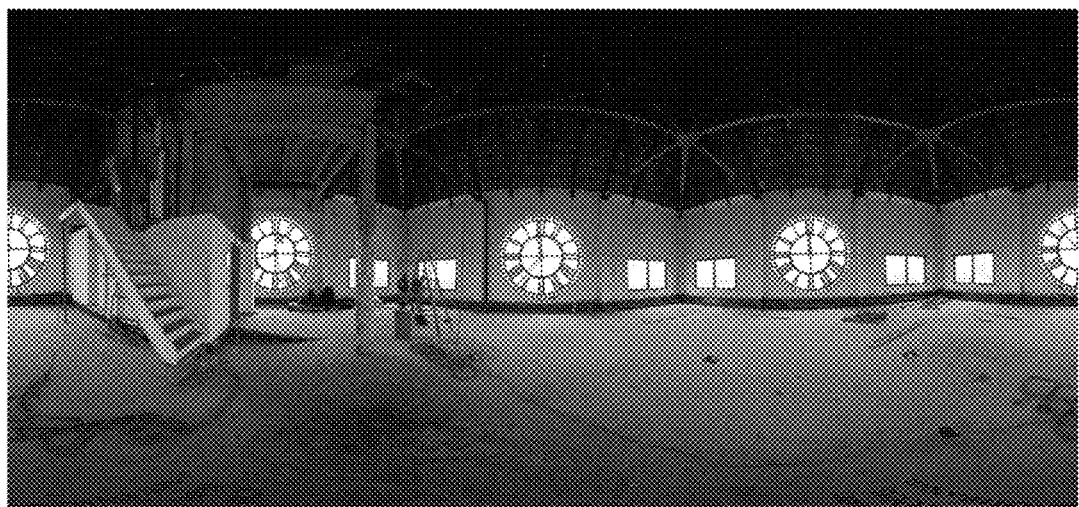

FIG. 5 shows an exemplary 360° panorama image generated by a surveying device 1, merged to a full dome panorama image (top part) and merged at one side of the two captured images (bottom part).

By way of example, the panorama image depicted in the top of the figure is obtained by using two fish-eye cameras, each exhibiting a field of view with a horizontal aperture angle greater than 180° and a vertical aperture angle greater than 180°, wherein the two cameras are mounted to the telescope such that the two cameras have opposing fields of view. Both cameras capture an image at the same moment and from the same position and orientation of the surveying instrument. Since the two cameras exhibit fields of view with overlapping regions in the fringe area of the images, the images of the two cameras can be easily merged, e.g. based on corresponding features found in the fringe area.

For example, the two cameras are mounted at the remote ends of a shaft providing rotation of the telescope about the horizontal axis, e.g. as depicted by FIG. 1. Another possibility is to mount the two cameras on a main body of the telescope, e.g. in a back to back configuration, wherein the fields of view of the cameras are different by 180 degrees. The panorama image may also be generated by only using one camera.

The bottom of the figure depicts the same panorama, which is again obtained by using two cameras. However, this image is merged only at one side, in order to provide a better overview for the observer.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A surveying device for a coordinative position determination of a spatial point, wherein the surveying device comprises a transmission unit having a targeting component that can be rotated about a first axis of rotation and a second axis of rotation, wherein the targeting component is configured to provide for a distance measurement, which comprises transmission of measurement radiation by the targeting component in the direction of a target axis which is determined by an orientation of the targeting component, and reception of returning measurement radiation by the targeting component, wherein the surveying device comprises a base and a support that is mounted to the base such that it can be moved relative to the base about the first axis of rotation, wherein the targeting component is mounted to the support such that it can be moved relative to the support about the second axis of rotation, the surveying device comprising:

a camera which is fixedly mounted to the transmission unit as a sideward viewing camera with a viewing direction transverse to the target axis, wherein the camera is mounted in a way that its field-of-view moves with the targeting component and the second axis of rotation intersects the field-of-view of the camera, wherein the camera is configured to capture two images, wherein each of the two images is associated with a different distance measurement, each of which comprises transmission and reception of corresponding measurement radiation, and an image evaluator, configured for automatically identifying corresponding image features that are present in both of the two images, the corresponding image features representing reference points within the environment, and for a derivation of a spatial transformation parameter from a motion of the corresponding image features, wherein the spatial transformation parameter provides for a determination of a difference of a spatial pose of the target axis between the different distance measurements which correspond to the two images.

2. The surveying device according to claim 1, wherein the camera is arranged that the optical axis of the objective lens of the camera is parallel to the second axis of rotation.

3. The surveying device according to claim 1, wherein the surveying device comprises a further camera which is fixedly mounted to the transmission unit in a way that its field-of-view moves with the targeting component and the second axis of rotation intersects the field-of-view of the camera, wherein the camera and the further camera are facing in opposite directions and the further camera is configured to capture two images, wherein each of the two images is associated with a different distance measurement, each of which comprises transmission and reception of corresponding measurement radiation.

4. The surveying device according to claim 1, wherein the support is mounted to the base such that it can be moved in a motorized fashion relative to the base about the first axis of rotation, wherein the targeting component is mounted to the support such that it can be moved in a motorized fashion relative to the support about the second axis of rotation, and the camera is mounted at the targeting component and has a field-of-view of 90 degrees, particularly 180 degrees.

5. The surveying device according to claim 1, wherein the surveying device is configured to use the spatial transformation parameter to determine an angular change of the targeting component's orientation with respect to a rotation around at least one of the first and the second axis of rotation between the different distance measurements which correspond to the two images.

6. The surveying device according to claim 1, wherein the surveying device is configured to use the spatial transformation parameter to determine a change in position of the surveying device between the different distance measurements which correspond to the two images.

7. The surveying device according to claim 1, wherein the surveying device comprises an inertial measuring unit and/or a tilt sensor arranged in the targeting component and the surveying device is configured to determine an absolute alignment to the gravitational field by making use of the inertial measuring unit and/or the tilt sensor.

8. The surveying device according to claim 1, wherein the surveying device is configured to trigger an image capture by the camera at each instant when a distance measurement is carried out and to provide an image associated with the image capture to the image evaluator.

9. The surveying device according to claim 1, wherein the surveying device comprises an acceleration sensor configured for measuring a linear and/or angular acceleration, wherein the surveying device is configured to trigger an image capture by the camera when the acceleration sensor detects a linear and/or angular acceleration with an absolute value above a threshold value and to provide an image associated with the image capture to the image evaluator, wherein the surveying device is configured to identify a moving state of the targeting component based on the acceleration sensor and the image capture is triggered at a defined frame rate during the moving state.

10. The surveying device according to claim 1, wherein the surveying device comprises a relocation mode, wherein a series of images is captured by the camera during relocation from a first location of the surveying device to a second location of the surveying device, a simultaneous localization and mapping (SLAM) process is carried out using the series of images, and, based thereof, a difference of a spatial pose of the target axis in the first location, particularly corresponding to a distance measurement carried out from the first location, and a spatial pose of the target axis corresponding to a distance measurement carried out from the second location is determined, wherein the surveying device comprises a movement sensor configured to detect a start and a stop of a movement of the surveying device as a whole and the relocation mode is triggered and stopped by the movement sensor.

11. A surveying device for a coordinative position determination of a spatial point, wherein the surveying device is embodied as total station and comprises a transmission unit having a targeting component that can be rotated about a first axis of rotation and a second axis of rotation, wherein the targeting component is configured to provide for a distance measurement, which comprises transmission of measurement radiation by the targeting component, thereby defining a target axis, and reception of returning measurement radiation by the targeting component, wherein the surveying device comprises a base and a support that is mounted to the base such that it can be moved relative to the base about the first axis of rotation, wherein the targeting component is mounted to the support such that it can be moved relative to the support about the second axis of rotation, the surveying device comprising:

an automatic target search functionality configured to automatically find a spatial reference point within the environment, wherein the spatial reference point is a spatial point associated with a known visual attribute, a camera which is fixedly mounted to the transmission unit in a way that its field-of-view moves with the targeting component, wherein the camera is configured to capture two images when moving the surveying device from a first location to a second location, wherein each of the two images is associated with a different distance measurement, each of which comprises transmission and reception of corresponding measurement radiation, and an image evaluator, configured for automatically identifying corresponding image features that are present in both of the two images, the corresponding image features representing reference points within the environment, and for a derivation of a spatial transformation parameter from a motion of the corresponding image features, wherein the spatial transformation parameter provides for a determination of a difference of a spatial pose of the target axis between the different distance measurements which correspond to the two images, and wherein the surveying device is configured to use the image evaluator to provide for determination of a difference of a spatial pose of the target axis between the first and the second location based on the spatial transformation parameter, wherein the surveying device is configured to carry out a distance measurement to three spatial reference points from the first location by using the transmission radiation and to carry out, automatically based on the target search functionality, a distance measurement to the three spatial reference points from the second location by using the transmission radiation, thereby measuring 3D coordinates of the three different spatial reference points both from the first and second location, and to use a position resection technique by taking into account the 3D coordinates of the three different spatial reference points measured from the first and the second location to provide for an improved determination of the difference of the spatial pose of the target axis between the first and the second location.

12. The surveying device according to claim 11, wherein a difference of a pose of the target axis in the first location and a pose of the target axis in the second location is determined by means of a SLAM process, wherein from the second location the three spatial reference points are aimed at by taking into account the difference of the pose of the target axis.

13. The surveying device according to claim 11, wherein the surveying device comprises a relocation mode, wherein a series of images is captured by the camera during relocation from the first location of the surveying device to the second location of the surveying device, a simultaneous localization and mapping (SLAM) process is carried out using the series of images, and, based thereof, a difference of a spatial pose of the target axis in the first location and a spatial pose of the target axis corresponding to a distance measurement carried out from the second location is determined, wherein the surveying device comprises a movement sensor configured to detect a start and a stop of a movement of the surveying device as a whole and the relocation mode is triggered and stopped by the movement sensor.

14. The surveying device according to claim 11, wherein the support is mounted to the base such that it can be moved in a motorized fashion relative to the base about the first axis of rotation, wherein the targeting component is mounted to the support such that it can be moved in a motorized fashion relative to the support about the second axis of rotation, and the camera is mounted at the targeting component and has a field-of-view of 90 degrees, particularly 180 degrees.

* * * * *